Figure 2:
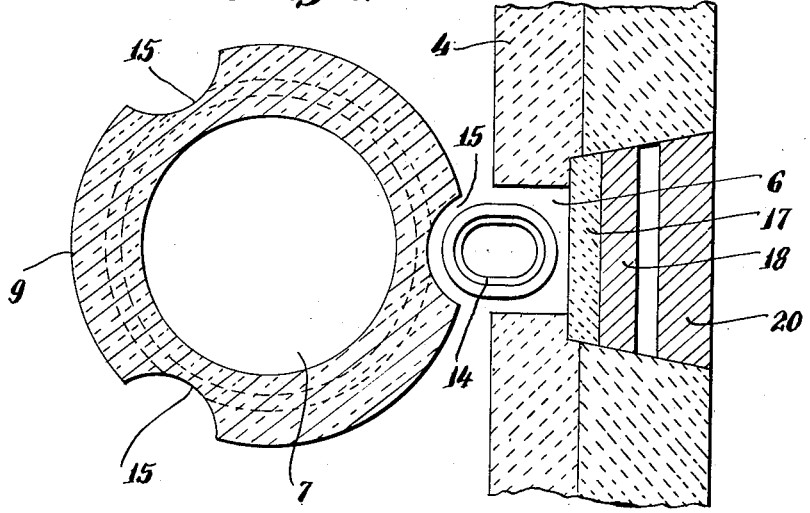

Feb. 13, 1951  F. UHRMANN  2,541,310
MELTING KETTLE FOR GLASS
Filed Aug. 24, 1949

INVENTOR.
Franz Uhrmann
BY Walter S. Aleston
ATTORNEY.

Patented Feb. 13, 1951

2,541,310

UNITED STATES PATENT OFFICE 2,541,310

MELTING KETTLE FOR GLASS

Franz Uhrmann, Muhldorf am Inn, Germany

Application August 24, 1949, Serial No. 112,155
In Germany July 20, 1949

5 Claims. (Cl. 49—60)

The invention relates to certain improvements in the construction of melting kettles for glass which are used in pot furnaces.

So far in the operation of pot furnaces it is unavoidable that certain quantities of glass which in general amount to 2 to 5 percent of the throughput, will flow over the brim of the kettle and into the hearth of the furnace, whereby a corresponding quantity of glass is lost for the production, since the glass flown into the hearth of the furnace is rendered useless for technical purpose owing to impurifications. The wasted glass has to be drawn off from the glass pockets of the furnace from time to time. Moreover, the bottom of the furnace is exposed to strong chemical attacks by the glass running down from the kettle. As a result, the bottom becomes uneven by wear and the glass which has flown into the hearth is accumulated in the depressions and in the course of time penetrates also into the draughts, channels and regenerators and causes disturbances in the operation of the furnace.

Overflowing of the glass over the brim of the kettle is caused, for instance, in the melting process by excessive frothing of the glass and by the formation of bubbles. Also when feeding the kettles with glass raw material the danger is present that molten glass may be displaced over the brim of the kettle by the sinking down of the fed mixture. When taking the glass out of the kettle it is unavoidable that certain quantities of glass are drawn over the brim of the kettle by the glass ladles and get likewise into the hearth of the furnace. Finally glass may flow into the hearth by the formation of cracks or other leaks in the walls of the kettle or by damages of the brim of the kettle.

It is the object of the present invention to provide means by which these undesirable phenomena are avoided. Another object of the invention is to facilitate and render more economical the operation of pot furnaces.

With these and further objects in view which will hereinafter appear, according to the present invention a collecting trough is arranged all around the outer wall of the glass melting kettle, for the glass flowing over the brim of the kettle, and provided with a discharge or overflow. In a preferred form of the invention a plurality of discharges are distributed over the circumference of the collecting trough, e. g. in the form of three discharge jags or notches staggered by 120° each. One of the discharges is always directed towards the fire hole. Since the kettles as a rule are standing on a bed of quartz sand with an inclination towards the tap hole, all the glass flowing over the brim of the kettle is thus collected in the trough and discharged in a molten condition through the respective discharge directed towards the fire hole. According to a further feature of the invention there is provided a glass collecting pot which is adapted to be placed under the respective overflow which is actually used, said pot being accommodated in the fire hole and being screened towards the outside by the conventional screening plate of chamotte to which a further insulating plate may be added.

The collecting trough is formed integral with the melting pot or kettle by an inclined projection of the outer wall whose upper side is advantageously formed in such a way that it presents at its outer part an inwardly inclined annular zone terminating in an annular groove forming the collecting trough, whose vertical inner wall is flush with the outer wall of the kettle. Advantageously, recesses are provided at the under side of the projection for accommodation of the glass collecting pot underneath the overflows of the collecting trough.

Figure 1:
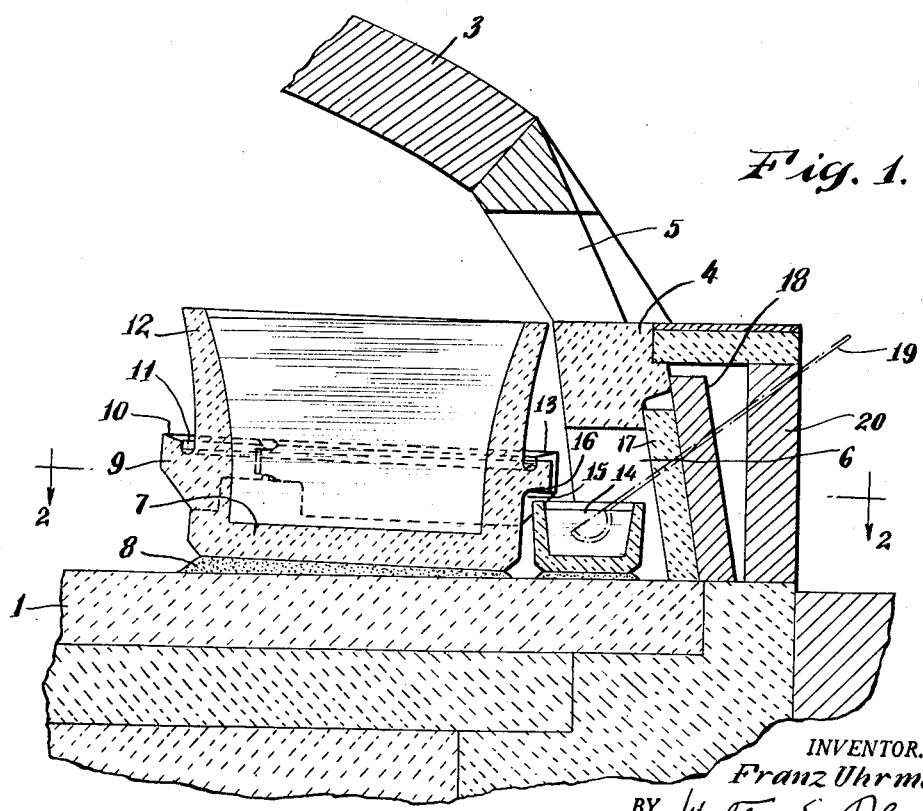

Further features and advantages of the invention will be seen from the following detailed description in connection with the accompanying drawing showing by way of example and purely schematically one embodiment of the invention and in which:

Fig. 1 is a vertical section through one side of the hearth of the furnace and the melting kettle for the glass placed therein, and Fig. 2 is a horizontal section on the line II—II in Fig. 1 through the glass kettle and the annular wall of the furnace.

Referring now to the drawing in greater detail, it will be seen that the pot furnace comprises in known manner the foundation or substructure 1 with the bottom 2 of the hearth and the arch 3 of the furnace which is supported on the annular wall 4. One discharge hole 5 and one fire hole 6 are provided for each pot or kettle.

The plane bottom of the melting pot or kettle 7 stands on a bedding of quartz sand 8 which is slightly outwardly inclined. According to the invention an inclined projection 9 is formed in one piece with the outer wall of the kettle, said projection forming an inwardly inclined annular zone 10 terminating in an inner annular groove 11 whose vertical inner wall passes over into the outer wall 12 of the kettle.

In the embodiment as shown there are provided three overflows or discharges 13 for the annular grooves 11, whose bottoms are disposed at a somewhat higher level than the bottom of the collecting trough formed by the annular groove 11. Thus it is ensured that the glass runs off always only from the discharge 13 facing the fire hole.

Placed on the bottom of the fire hole 6 is a glass collecting pot 14 whose edge is disposed underneath the projection 9 which to this end is formed with curved recesses 15 underneath the discharges 13. Each discharge is provided with a nose 16 for facilitating the dripping off of the molten glass.

The fire hole 6 may be closed by a screening plate 17, by a further insulating plate 18 and by a wall 20.

It will be understood that all the glass flowing over the brim of the kettle at any point thereof will be collected in the collecting trough 11 and passed through the discharge 13 directed to the fire hole 6, respectively, into the collecting pot 14. It does not matter in this case by which influences the glass has been caused to overflow. Also the glass flowing off from the glass ladles as the kettle 7 is scooped out, gets partly into the collecting trough 11 and partly directly into the collecting pot 14. In case of damages at the kettle above the collecting trough the glass leaking out of the kettle will also be collected by the collecting trough 11 and conducted to the pot 14.

From the collecting trough 14 the glass may be returned directly into the glass kettle 7 by means of a ladle 19 as shown in dot and dash lines, since the glass run off from the kettle has not taken up any impurifications. The collecting pot 14 can also be lifted out of the furnace with the aid of a suitable device and emptied at once. It will depend on the service conditions which kind of emptying may be appropriate in each case and in which way the glass collected in the collecting pot 14 may be further treated.

The provision according to the invention of several, e. g. three, overflows 13 at the periphery of the collecting trough 11 permits to turn the melting kettle in such a way that in case of any damages at the kettle the damaged part may be disposed in a protected position while one of the overflows 13 is directed towards the fire hole.

The present invention may be applied to melting kettles for glass of any size and shape. There will be no accumulations of glass within the collecting trough 11, since the glass owing to the inclination of the kettle practically always existing will flow towards the fire hole and has a sufficiently high temperature as long as the furnace is in operation.

The main advantages of the invention consist in the fact that the glass cannot flow into the hearth and thereby cause disturbances and that moreover a substantial part of the throughput of glass can be recovered. Compared to the operation of pot furnaces with the conventional melting kettles the life of the furnace plant is substantially extended, the costs involved in the construction, the maintenance, and the operation of the furnace are reduced and the production is thus substantially cheapened.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A melting kettle for glass, of the type referred to, comprising an outer wall, an annular peripheral projection of said outer wall, said projection being of such a cross-section as to constitute a collecting trough arranged around the outer wall of the kettle and adapted to collect the glass flowing over the brim of the kettle, and overflow means at said collecting trough.

2. In a pot furnace, a melting kettle for glass, comprising an outer wall, an annular peripheral projection of said outer wall, said projection being spaced from the kettle bottom and being of such a cross-section as to constitute a collecting trough arranged around the outer wall of the kettle and adapted to collect the glass flowing over the brim of the kettle, and overflow means at said collecting trough; and a glass collecting pot adapted to be placed underneath the overflow means.

3. A melting kettle for glass, of the type referred to, comprising an annular projection of the outer side walls of said kettle, said projection having an outwardly and upwardly inclined lower surface and an inwardly and downwardly inclined circumferential zone at its upper side, terminating inwardly in an annular groove forming a collecting trough and having an inner wall lying flush with the outer side walls of said kettle, said collecting trough having overflow means.

4. In a pot furnace, a melting kettle for glass, comprising an annular projection of the outer side walls of said kettle, said projection having an outwardly and upwardly inclined lower surface and an inwardly and downwardly inclined circumferential zone at its upper side, terminating inwardly in an annular groove forming a collecting trough and having an inner wall lying flush with the outer side walls of said kettle, said collecting trough having overflow means, and a glass collecting pot, the inclined lower surface of said projection being recessed underneath said overflow means for permitting said collecting pot to be placed underneath said overflow means.

5. A melting kettle for glass, of the type referred to comprising an outer wall, an annular peripheral projection of said outer wall, said projection being spaced from the kettle bottom and being provided with a groove surrounding said outer wall and constituting a trough to collect glass flowing over the brim of said kettle, said projection being further provided with a radial recess constituting an overflow means from said trough, and a downwardly directed drip nose of said projection underneath said recess.

FRANZ UHRMANN.

REFERENCES CITED

The following references are of record in the file of this patent:

UNITED STATES PATENTS

| Number | Name | Date |
|---|---|---|
| 1,564,235 | Harrington | Dec. 8, 1925 |

FOREIGN PATENTS

| Number | Country | Date |
|---|---|---|
| 109,423 | Germany | Nov. 26, 1898 |